(12) United States Patent
Yates et al.

(10) Patent No.: US 8,671,831 B2
(45) Date of Patent: Mar. 18, 2014

(54) COOKING TRAY AND APPARATUS FOR SECURING COOKING TRAY

(75) Inventors: Barry G. Yates, Louisville, KY (US); Winston L. Shelton, Louisville, KY (US)

(73) Assignee: Winston Products Company, LLC, Louisville, KY (US)

( * ) Notice: Subject to any disclaimer, the term of this patent is extended or adjusted under 35 U.S.C. 154(b) by 1253 days.

(21) Appl. No.: 12/462,995

(22) Filed: Aug. 12, 2009

(65) Prior Publication Data

US 2010/0043650 A1 Feb. 25, 2010

Related U.S. Application Data

(60) Provisional application No. 61/188,759, filed on Aug. 12, 2008.

(51) Int. Cl.
*A47J 27/00* (2006.01)
(52) U.S. Cl.
USPC ............................ 99/446; D7/409; 211/181.1
(58) Field of Classification Search
USPC .................... 99/446, 449, 450; D7/409, 704; 211/181.1
See application file for complete search history.

(56) References Cited

U.S. PATENT DOCUMENTS

| | | | | | |
|---|---|---|---|---|---|
| 1,888,141 | A | * | 11/1932 | Orth | 211/41.2 |
| D104,555 | S | * | 5/1937 | Butters | D6/465 |
| 2,216,457 | A | * | 10/1940 | Salisbury | 99/443 R |
| 2,703,046 | A | * | 3/1955 | Ahlquist | 99/449 |
| 2,845,183 | A | * | 7/1958 | Paulsen | 211/71.01 |
| D443,473 | S | * | 6/2001 | Westfield | D7/409 |
| 6,595,120 | B1 | * | 7/2003 | Tiemann | 99/426 |
| 2006/0130673 | A1 | * | 6/2006 | Kaliveh et al. | 99/450 |

* cited by examiner

*Primary Examiner* — Dana Ross
*Assistant Examiner* — John Wasaff
(74) *Attorney, Agent, or Firm* — Bingham Greenebaum Doll LLP; James C. Eaves, Jr.; Brian W. Chellgren

(57) ABSTRACT

The present invention relates to an apparatus facilitating the cooking of multiple products simultaneously. More particularly, the present invention relates to cooking tray and cooking rack for securing the cooking tray. The cooking tray of the present invention comprises a downward extending member, a planar surface, convex rounded edges, lateral straight edges, convex upward extending surfaces, lateral upward extending surfaces, a transition area, and circulation vents. The cooking tray is inserted into a cooking rack along support bars or a platform and is secured using a downward extending member that is obstructed by a wire or the edge of the platform, deterring the cooking tray from falling or shifting during use. The cooking tray is removable from the cooking rack by lifting the cooking tray up the height of the downward extending member. The cooking tray is made of either a punched aluminum or wire, with circulation vents such that the products being cooked may be cooked evenly.

10 Claims, 15 Drawing Sheets

COOKING TRAY AND APPARATUS FOR SECURING COOKING TRAY

This application claims the benefit of U.S. provisional patent application Ser. No. 61/188,759, filed Aug. 12, 2008, for cooking tray and apparatus for securing cooking tray.

BACKGROUND OF THE INVENTION (a) Field of the Invention

The present invention relates to an apparatus facilitating the cooking of multiple products simultaneously. More particularly, the present invention relates to a cooking tray and cooking rack for securing a cooking tray therein.

(b) Background of the Invention

In the field of cooking technology, the opening and cavity in the cookers that receive the cooking tray are typically of circular cross-section. Typically, the same cooking tray is used in the cooker as is used to store the cooked product and later for presenting the cooked product for service to a customer. Typically, multiple cooking trays are placed on a rectangular presentation pan. While, circular cooking trays provide the greater surface area within the cooker upon which to place the products being cooked, they are inefficient when placed on the rectangular presentation pans. Round cooking trays use the outer area of the cookers efficiently by extending to the outer surface of the cooker, but use the inner area of presentation pans inefficiently by abutting round edges next to one another creating gaps between the trays. An apparatus is desired that provides increased space efficiency when used in connection with existing cookers and presentation pans.

Further, cookers are generally top-loaded, having a lid on the top of the cooker covering the opening to the cavity of the cooker into which the racks containing the cooking trays full of products to be cooked are loaded. Cooking trays are typically added to the cooker using either stackable trays and tongs to place the cooking trays in and to remove the cooking trays from the cooker or a clam-shaped apparatus containing the cooking trays full of products to be cooked. Problems can exist with each method. Particularly, the use of tongs is very unstable, causing cooking trays and the products being cooked, primarily chicken, for example, to possibly fall to the ground when being removed from the cooker.

SUMMARY OF THE INVENTION

The present invention addresses the shortcomings of the prior art and provides, among other things, a cooking tray with at least one downward extending member to deter the cooking tray from moving or sliding when received by a cooking rack, and a cooking rack capable of receiving said cooking tray.

The cooking tray of the present invention is designed having two lateral straight edges and two convex rounded edges. The shape is essentially that of a circle with two sides cut to form two lateral straight edges. The convex rounded edges provide the maximum cooking space, while the lateral straight edges provide a more efficient use of the space within the presentation pan. By bending the edges of the material composing the planar surface of the cooking tray in an upright and transverse position from the planar surface, a container aspect is provided. Often when products are being cooked by being submerged into cooking vats filled with shortening and other ingredients, the products being cooked have a tendency to float away. The container aspect of the cooking tray provides a greater ability to maintain the products being cooked on the cooking tray.

The cooking tray incorporates open spaces to allow all cooking ingredients, including shortening and any other cooking ingredients, to reach the products being cooked from all directions to ensure an even cooking. These open spaces can be achieved by either punching holes in a solid material such as, for example, aluminum, or using a wire design for the cooking tray. Ideally, the number of open spaces is maximized to allow the greatest access to the products being cooked, while still maintaining the structural stability of the cooking tray.

A need exists for cooking trays that can be loaded into a cooker in a convenient and stable manner. The present invention incorporates the use of a cooking rack to be inserted into the cooker from above. The present invention provides a cooking rack in which cooking trays are conveniently side-loaded into said cooking rack and secured into position such that the cooking trays are deterred from moving within the cooking rack without being lifted over a platform or wire that is used to hold the cooking trays in place within the cooking rack.

The present invention incorporates the use of a cooking rack having at least one support mechanism which obstructs the downward extending member of the cooking tray, thereby deterring movement of the cooking tray. The cooking rack of the present invention thereby increases the stability of the cooking trays within the cooker. The deterrent of the cooking rack of the present invention may be accomplished either by using a wire along the rear of the cooking rack, or a platform or z-shaped platform upon which cooking trays sits, being a length of approximately about 3.360 inches, making it short enough to fit within the space between the downward extending members of the cooking tray, but long enough to stably support the cooking tray.

In the first embodiment, the cooking rack of the present invention includes preferably six levels of z-shaped platforms, having the z-shaped components on both sides of the cooking rack, totaling twelve z-shaped components. On each z-shaped platform, a single cooking tray is inserted, with either of the round edges being inserted first. The z-shaped components for each z-shaped platform of this embodiment would have a length shorter than the distance between the downward extending members of the cooking tray, allowing the cooking tray to be inserted over the z-shaped platform and the planar surface of the cooking tray to rest of the platform, allowing the platform itself to obstruct the downward extending member from becoming displaced from the cooking rack. The z-shaped platform is located approximately equidistant from the front vertical edge of the wall of the cooking rack and the rear vertical edge of the cooking rack. This embodiment may further include the use of additional horizontal support members as in the above embodiment to provide additional support to the cooking trays.

In the second embodiment, a wire along the rear of the cooking rack will obstruct the downward extending member of the cooking tray to deter the movement of the cooking tray in a forward direction. The cooking rack of this embodiment may additionally have a second wire near the front of the cooking rack at a distance approximately less than 3.360 inches in front of the rear wire, such that the portion downward extending member transverse to the cooking tray will sit on either side of the wire. The cooking rack of this embodiment will additionally have a series of horizontal support members, preferably at 6 different levels, to support a cooking tray at each level. The horizontal support may be two wires or bars crossing at about 90 degrees along the center point of the cooking rack, connected to the outer vertical support members.

In a third embodiment, the cooking rack of the present invention includes preferably five levels of platforms, having the platforms components on both sides of the cooking rack, totaling ten platform components. Each platform of this embodiment is created by making an incision in a u-shape at the base of the position where the platform is to be created. The solid material comprising the walls is then bent transverse to the side wall of the cooking rack from which the platform is connected. On each platform, a single cooking tray is inserted, with either of the round edges being inserted first. The platform components for each platform of this embodiment would have a length shorter than the distance between the downward extending members of the cooking tray, allowing the cooking tray to be inserted over the platform and the planar surface of the cooking tray to rest of the platform, allowing the platform itself to obstruct the downward extending member from becoming displaced from the cooking rack. The platform is located approximately equidistant from the front vertical edge of the wall of the cooking rack and the rear vertical edge of the cooking rack. This embodiment may further include the use of additional horizontal support members as in the above embodiment to provide additional support to the cooking trays.

The downward extending member of the present invention is located on the bottom of the cooking tray and is generally J-shaped. Each cooking tray preferably has four J-shaped downward extending members on its bottom surface. Each J-shaped downward extending member has a long arm and a short arm. The J-shaped downward extending members are oriented such that the long arm of each downward extending member is facing outward from the widthwise center axis of the cooking tray so that the long arm is oriented towards the nearest convex rounded edge. With this orientation, the cooking tray may use the long arm of the J-shaped downward extending member to slide over the platform or wire of the cooking rack and fall down causing the cooking tray to be secured in to place. Once secured, the cooking tray sits flat on the horizontal support member or z-shaped platform. The J-shape shape of the downward extending members allow the cooking tray to be inserted into the cooking rack either forwards or backwards. The downward extending member and platform provides greater stability to the cooking trays and avoids the necessity of tongs for top-loaded cookers while avoiding the instability of clam-shaped cooking racks. Once the cooking tray is inserted into the cooking rack, the cooking rack can be lowered into the cooker from above and be used.

In one embodiment, the present invention comprises a cooking tray, the cooking tray comprising a planar surface having a plurality of circulation vents therethrough, the planar surface having at least one downward extending member therefrom, the planar surface having at least one edge with at least one upward extending surface extending therefrom, and wherein the cooking tray is constructed from a single sheet of material. Preferably, the cooking tray is constructed from a single sheet of punched aluminum. More specifically, the at least one edge includes convex rounded edges and lateral straight edges, and the at least one upward extending surface includes convex upward extending surfaces connected to the convex rounded edges and lateral upward extending surfaces connected to the lateral straight edges.

In another embodiment, the present invention comprises a cooking apparatus, wherein the cooking apparatus comprises at least one cooking tray constructed from a single sheet of material, the cooking tray comprising a planar surface having a plurality of circulation vents therethrough, the planar surface having a plurality of downward extending members therefrom, and the planar surface having at least one edge with at least one upward extending surface extending therefrom. In this embodiment, the cooking apparatus also comprises a cooking rack for securing the at least one cooking tray, the cooking rack having at least one support mechanism, whereby the at least one cooking tray is supported by the at least one support mechanism such that at least one of the plurality of downward extending member is obstructed by the at least one support mechanism. More specifically, the at least one edge includes convex rounded edges and lateral straight edges, and the at least one upward extending surface includes convex upward extending surfaces connected to the convex rounded edges and lateral upward extending surfaces connected to the lateral straight edges.

In yet another embodiment, the present invention comprises a cooking tray having a first wire defining convex rounded edges and lateral straight edges, a planar surface formed by a plurality of wires attached to the first wire, at least one downward extending member, a second wire having the same shape as the first wire, and at least one vertical support wire supporting the second wire above the first wire, whereby the first wire and the second wire define convex upward extending surfaces and lateral upward extending surfaces.

In a further embodiment, the present invention comprises a cooking apparatus, wherein the cooking apparatus comprises at least one cooking tray, the at least one cooking tray having a first wire defining convex rounded edges and lateral straight edges, a planar surface formed by a plurality of wires attached to the first wire, a plurality of downward extending members, a second wire having the same shape as the first wire, and at least one vertical support wire supporting the second wire above the first wire, whereby the first wire and the second wire define convex upward extending surfaces and lateral upward extending surfaces. In this further embodiment, the cooking apparatus also comprises a cooking rack for securing the at least one cooking tray, the cooking rack having at least one support mechanism, whereby the at least one cooking tray is supported by the at least one support mechanism such that at least one of the plurality of downward extending members is obstructed by the at least one support mechanism.

BRIEF DESCRIPTION OF THE DRAWINGS

A better understanding of the present invention will be had upon reference to the following description in conjunction with the accompanying drawings, wherein.

DETAILED DESCRIPTION OF THE PREFERRED EMBODIMENT

Figure 1:
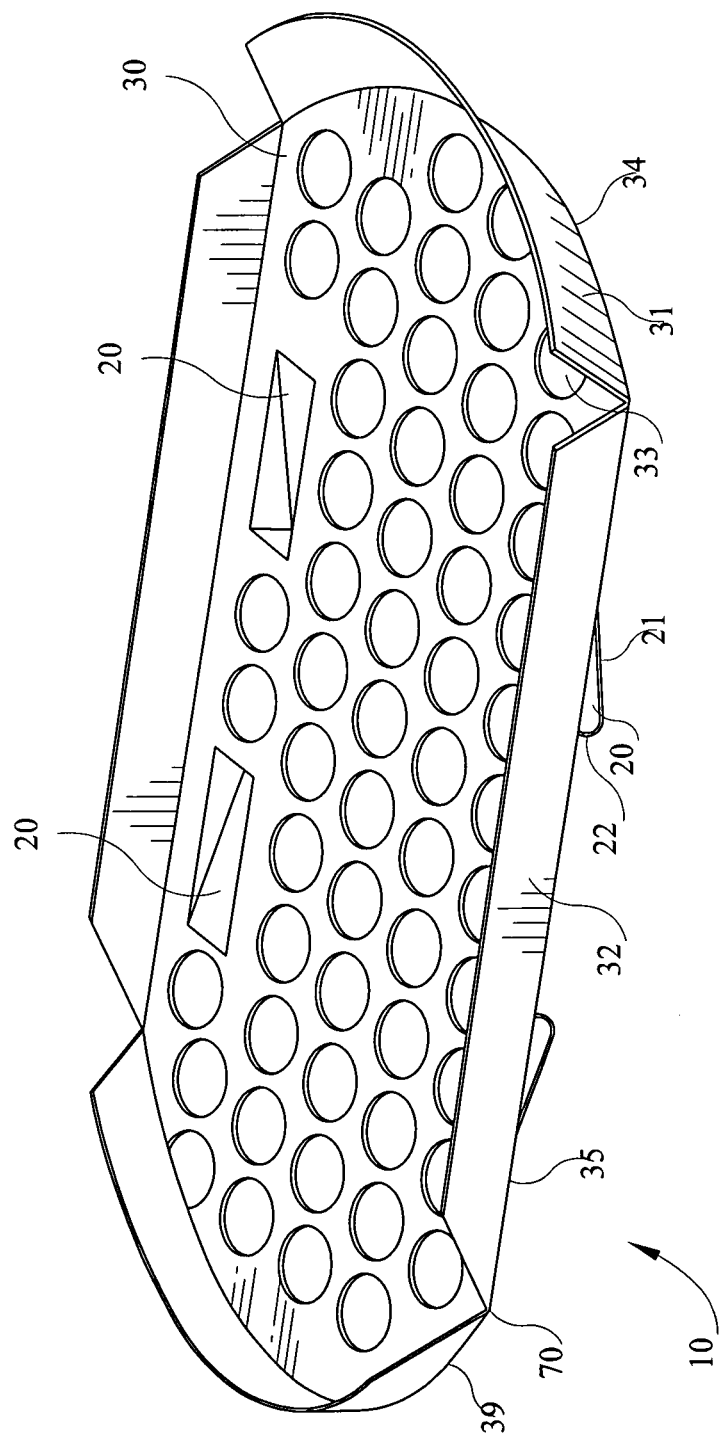
FIG. 1 shows a perspective view of a cooking tray.

Referring now to FIG. 1-15, and more specifically to FIG. 1-4, the cooking tray 10 embodied in the present invention is shown comprising a plurality of downward extending members 20, a planar surface 30, convex rounded edges 34, lateral straight edges 35, transition area 39, convex upward extending surfaces 31, lateral upward extending surfaces 32 and circulation vents 33 to be used with a cooking rack 50.

For illustration purposes, the following description is of a preferred embodiment of the present invention. The dimensions of the cooking tray and cooking rack are intended to correspond to a cooker having a width of about 20.2 inches, a depth of about 30 inches, a height of about 37.8 inches, with a circular opening on top of the cooker with a diameter of about 14.205 inches.

A 12.329 inch by 9.624 inch sheet of material is preferably used to construct the cooking tray 10 of the present invention. The planar surface 30 of the cooking tray 10 of the present invention has two lateral straight edges 35 and two convex rounded edges 34. The curve of the convex rounded edges 34 has a preferable diameter of 12.329 inches. A notch 70 is cut at the four corners of the sheet of material at a distance of about 0.763 inches from each edge and about 0.763 inches deep. The notch 70 should be cut from the convex rounded edge 34 in a direction parallel with the lateral flat edge 35, and from the lateral flat edge 35, at an angle of about 52 degrees from the lateral flat edge 35. At each notch 70, the convex rounded edge 34 is bent or inclined upward to a position between about 60 degrees and about 80 degrees, or more specifically, to a position about 72 degrees from the planar surface 30, creating the convex upward extending surface 31 having a height 36 of 0.763 inches. At each notch 70, the lateral flat edge 35 is inclined upwards or bent to a position of about 90 degrees from the planar surface 30, creating a lateral upward extending surface 32. The convex upward extending surface 31 and the lateral flat vertical surface 32 are connected to the planar surface 30 by a transition area 39. The planar surface 30 is about 8.375 inches in width 38 and about 11.142 inches in length 37.

The downward extending member 20 is located at the base of the planar surface. The downward extending member 20 may be curved, generally L-shaped, generally V-shaped, generally J-shaped, or any other suitable configuration. In a preferred embodiment, the downward extending member 20 is generally J-shaped. The downward extending member 20 is to be created from the sheet of material comprising the planar surface 30 by making incisions in the planar surface 30 along the lengthwise sides of the downward extending member 20 and deforming the material downwards to create the downward extending member 20. The long arm 21 of the J-shaped downward extending member 20 is at an angle of about 15° from the planar surface 30. The long arm 21 has a length 25 of about 0.948 inches. The short arm 22 is generally transverse to the planar surface and is curved. The downward extending member 20 has a height 23 of about 0.305 inches and a length 24 of about 1.069 inches. The width 43 of the downward extending member 20 is preferably about 0.50 inches.

Figure 2:
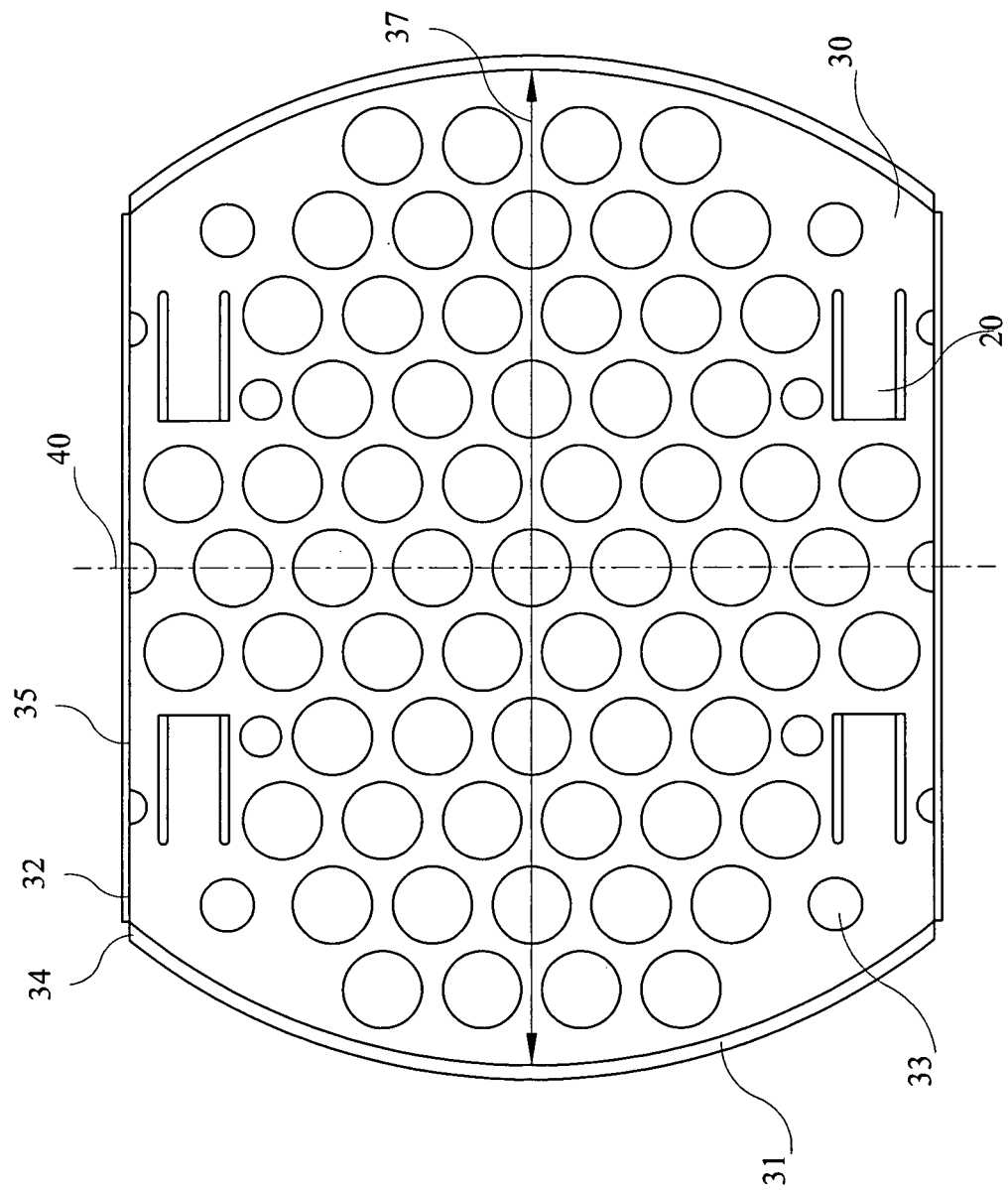
FIG. 2 shows a top view of the cooking tray of FIG. 1.
Figure 3:
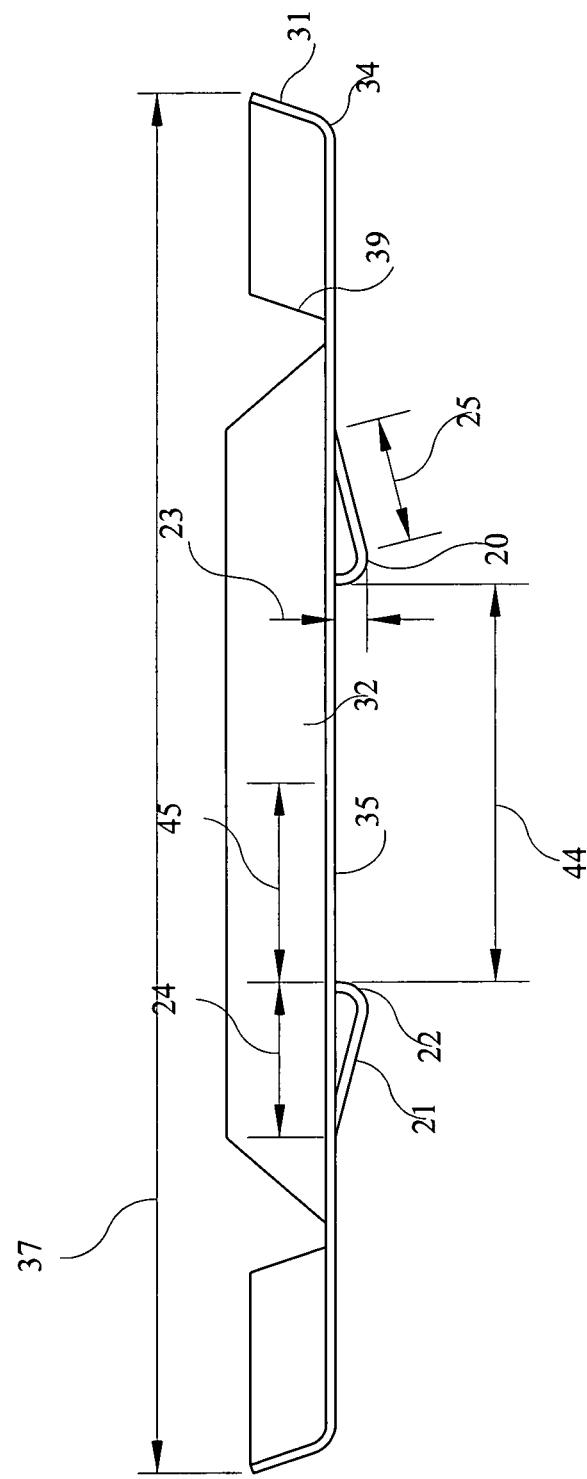
FIG. 3 shows a side view of the cooking tray of FIG. 1.
Figure 4:
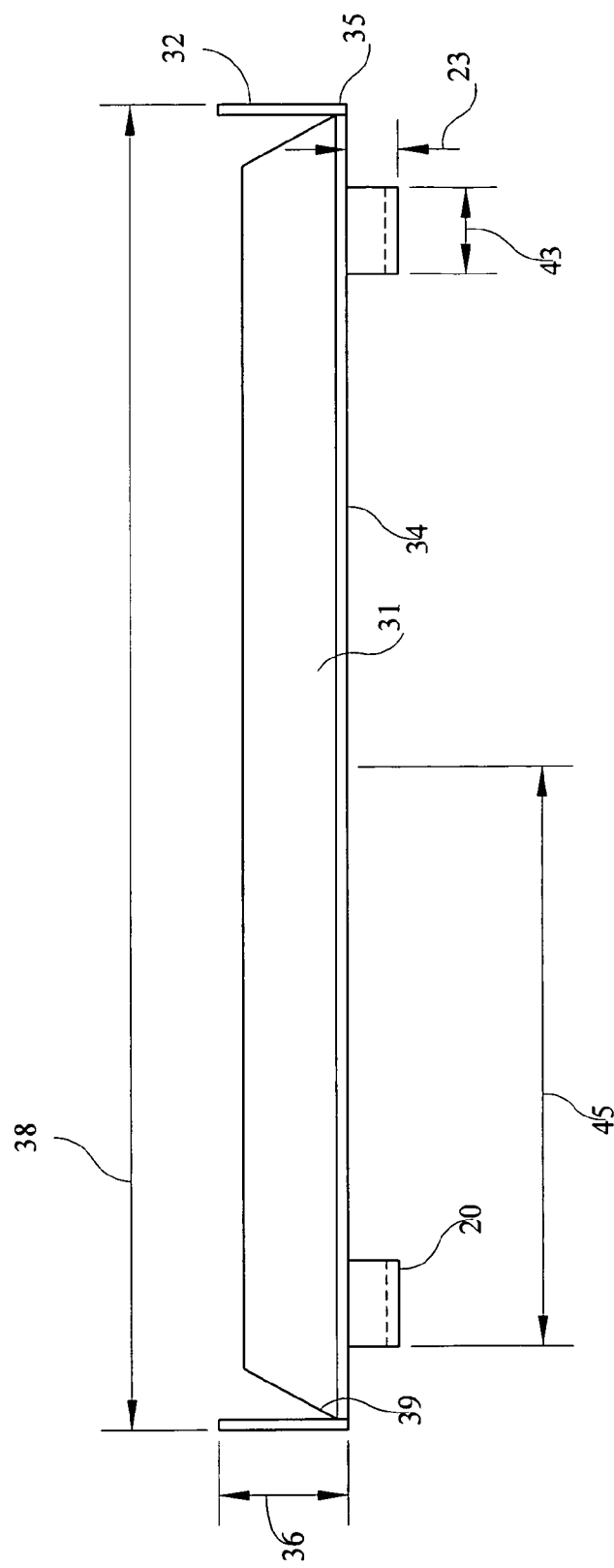
FIG. 4 shows a front view of the cooking tray of FIG. 1.

In a preferred embodiment, there are four downward extending members 20 attached to the underside of the planar surface 30. On each side of central axis 40 should be two downward extending members 20 with their long arms 21 facing outward, towards convex rounded edges 34. In this preferred embodiment, as shown in FIG. 2, one downward extending member 20 is located in each quadrant of the planar surface 30. This design permits the cooking tray 10 to be inserted into the cooking rack 50 from either direction. The bases of the short arms 22 of each downward extending member 20 are separated by a distance 44 of about 3.365 inches.

The outer edge of the downward extending member 20 is a distance 45 of about 3.682 inches from center point of central axis 40.

The cooking trays 10 are to be loaded with products, such as chicken, to be cooked in a cooker. The upward extending surfaces 31 and 32 provide a container-like ability to keep the products to be cooked on the cooking tray 10 when being cooked.

Figure 8:
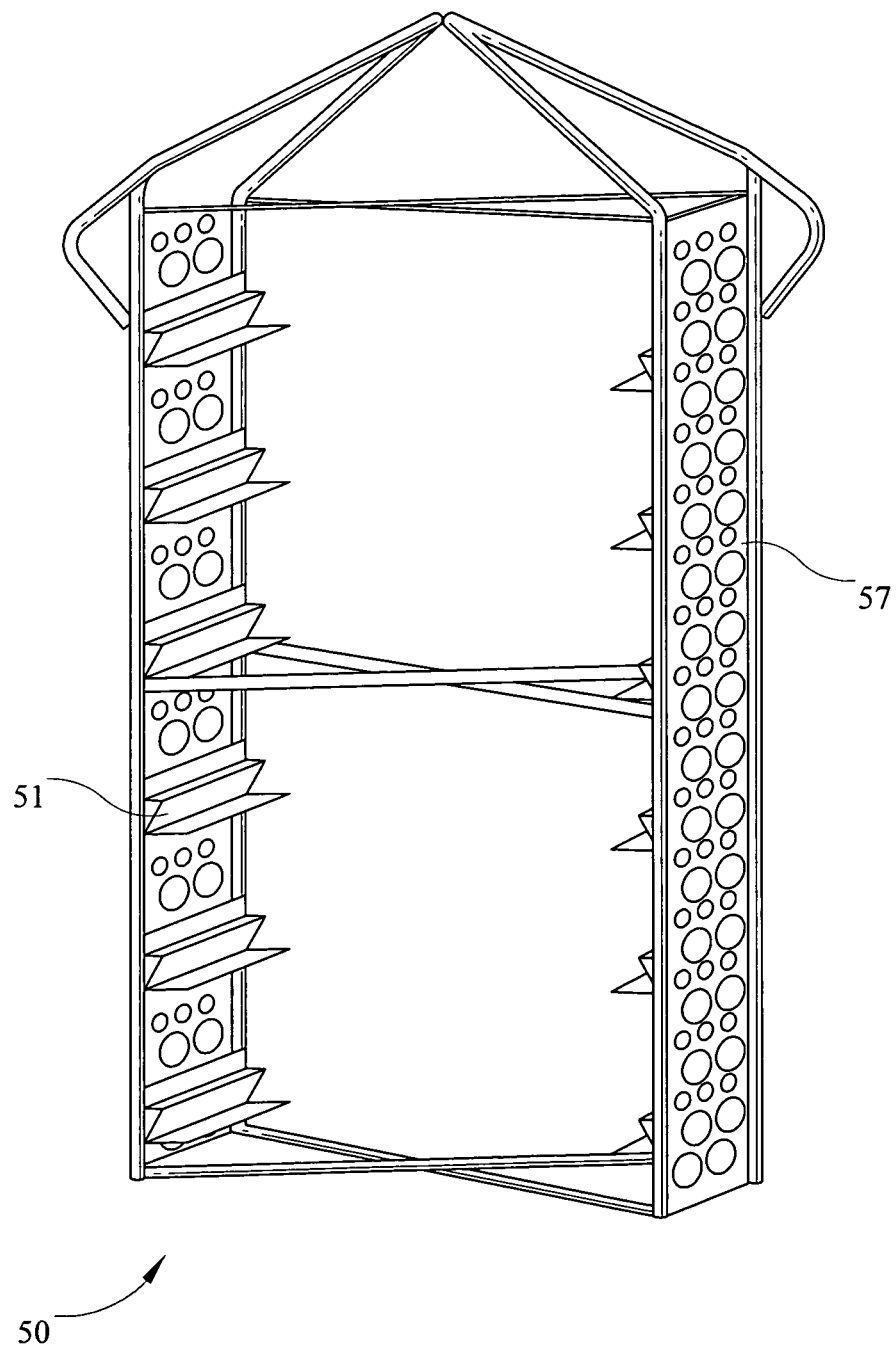
FIG. 8 shows the cooking rack having z-shaped platforms.
Figure 9:
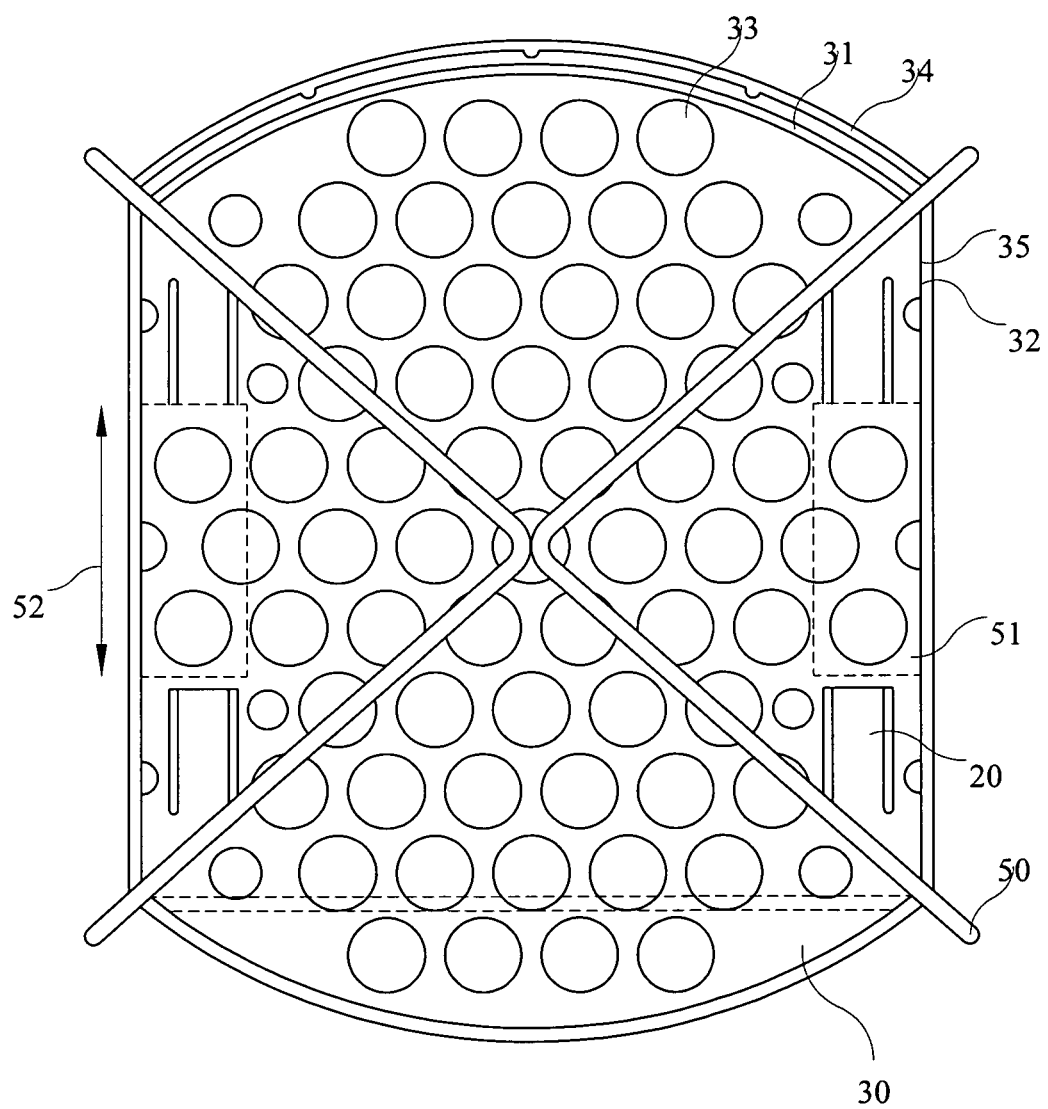
FIG. 9 shows a top view of the cooking rack of FIG. 8 with a cooking tray inserted.
Figure 10:
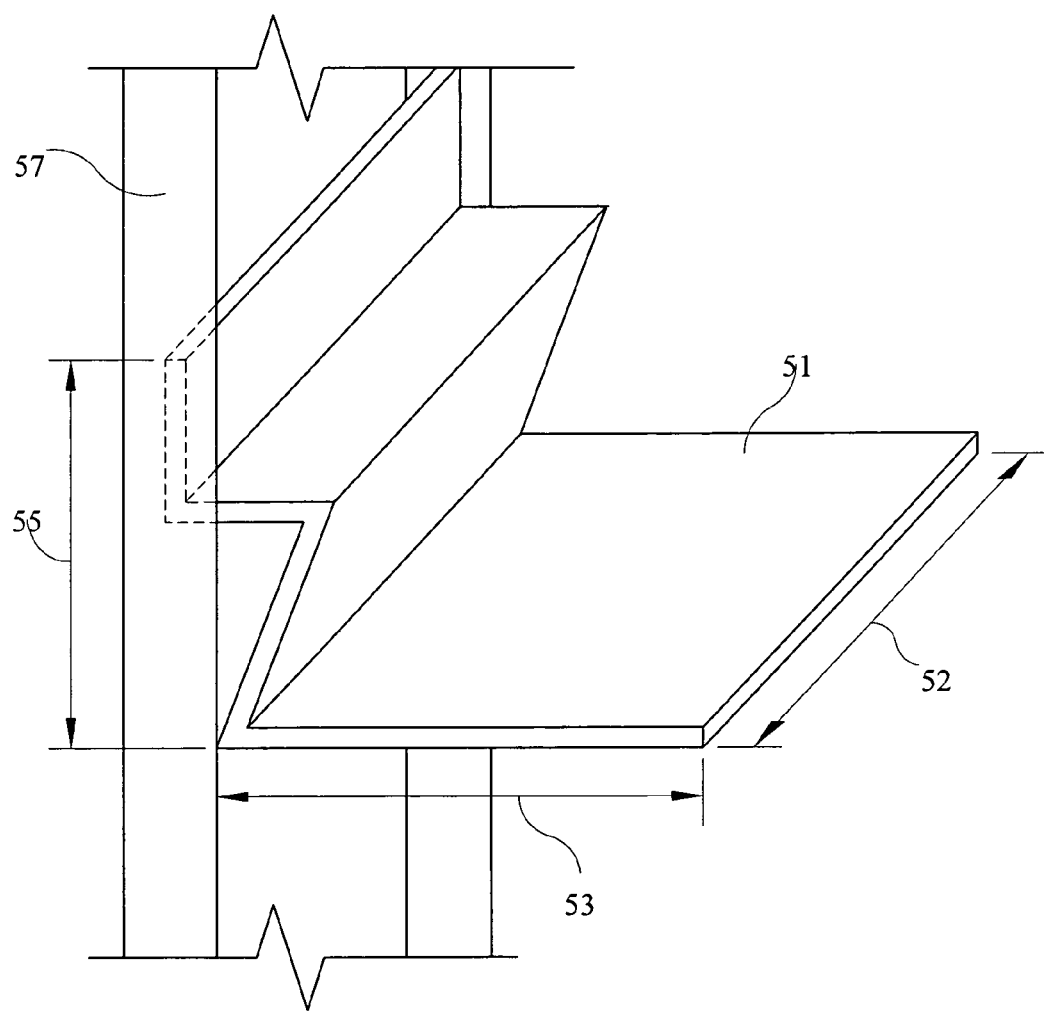
FIG. 10 shows the z-shaped platform of the cooking rack of FIG. 8.

Referring now to FIG. 8-10, the cooking tray 10 is inserted into the cooking rack 50 from the side. In a first embodiment, the cooking rack 50 contains a z-shaped platform 51 approximately 3.2 inches in length 52 and 1.5 inches in width 53 and 1.5 inches in height 55. The cooking tray 10 is inserted into the cooking rack 50 by sliding along the z-shaped platform 51. When inserted, the cooking tray 10 sticks out over the front edge of the cooking rack 50. The cooking tray 10 slides onto the z-shaped platform 51 using the long arm 21 of the downward extending member 20 to facilitate insertion. When the cooking tray 10 reaches the end of the z-shaped platform 51, the cooking tray 10 falls down into place, causing the cooking tray 10 to sit directly on the z-shaped platform 51, being supported along the lateral straight edges 35. The downward extending member 20 nearest the rear of the cooking rack 10 sits abutted to the edge of the z-shaped platform 51. In a preferred embodiment of the cooking tray 10, the two downward extending members 20 on the same side of central axis 40 are opposed and cooperative, whereby contact between the downward extending members 20 and the z-shaped platform 51 restricts forward and backward motion of the cooking tray 10. For the cooking tray 10 to be removed from the cooking rack 50, the cooking tray 10 must be lifted at least about 0.305 inches, so as to remove the downward extending member 20 from being obstructed by the edge of the z-shaped platform 51. The downward extending member 20 deters the cooking tray 10 from falling out of the cooking rack 50 when being inserted and removed from the cooker.

As shown in FIG. 8, the cooking rack 50 of this embodiment 50 contains walls 57 along the sides having the z-shaped platforms 51. In this embodiment, the walls 57 are to be produced from a punched aluminum or similar composition to provide vents for the circulation of the cooking ingredients, including shortening and any other cooking ingredients, such that the flow of cooking ingredients may evenly cook the products at an even temperature. The walls 57 of this embodiment should be punched to create a plurality of circular holes to provide for the maximum circulation of cooking ingredients while maintaining the structural integrity of the cooking rack 50.

Figure 11:
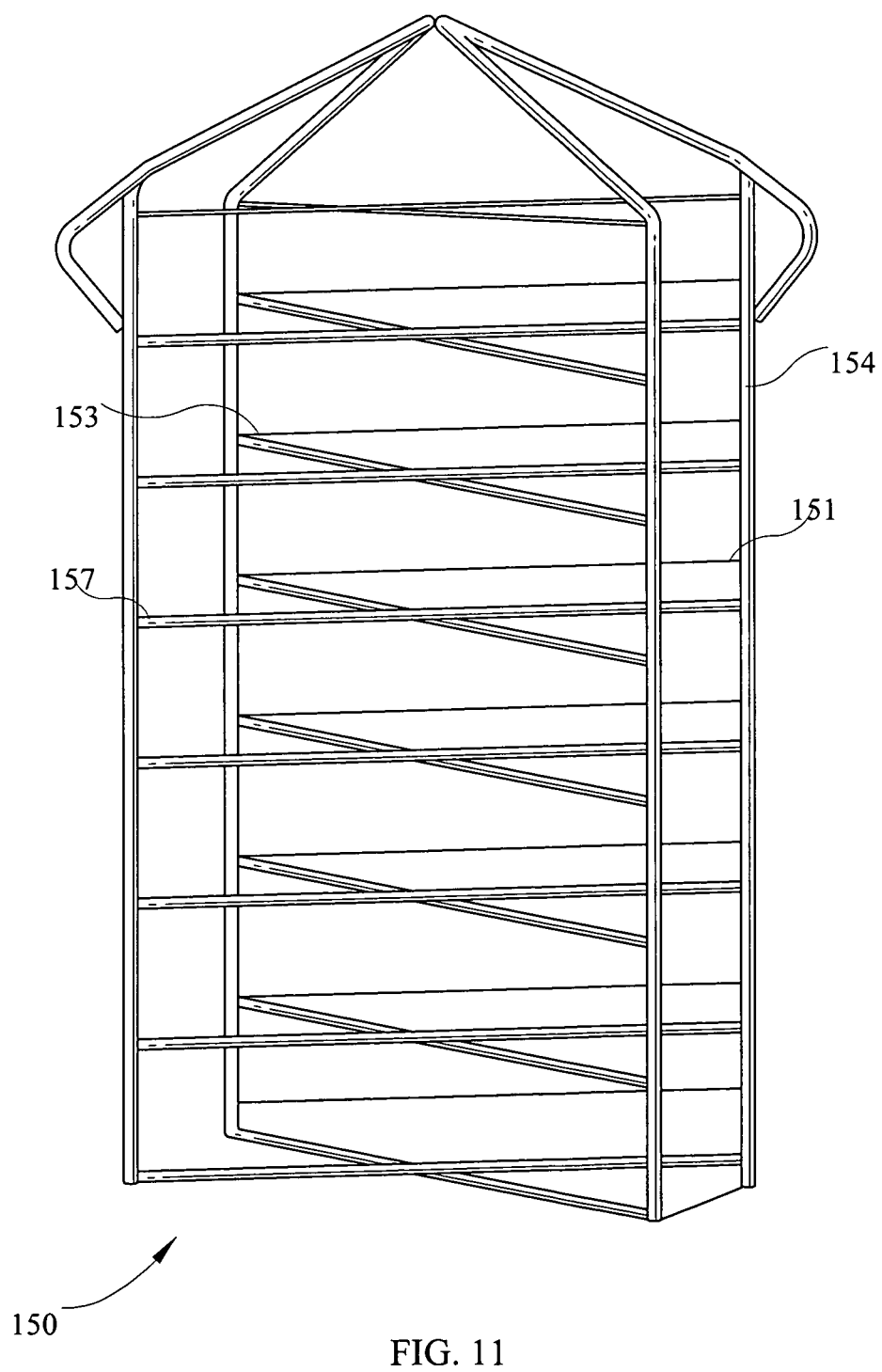
FIG. 11 shows an alternative cooking rack.
Figure 12:
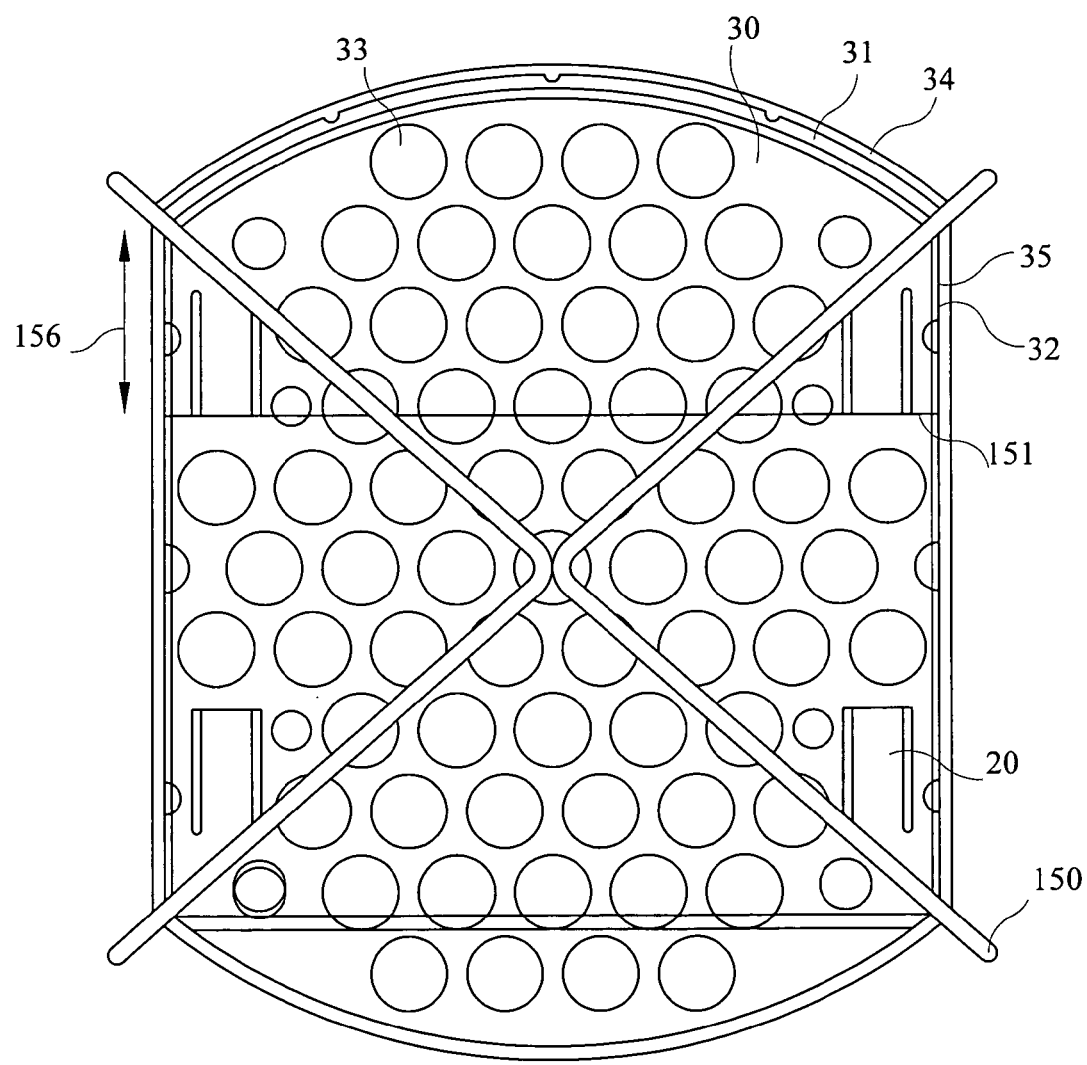
FIG. 12 shows a top view of the cooking rack of FIG. 11 with a cooking tray inserted.

In an alternative embodiment, FIG. 11-12 show the cooking rack 150 having a wire 151 strip across the rear vertical support bars 154 approximately 0.2 inches in width. The cooking tray 10 is inserted into the cooking rack 150 by sliding over the wire 151. When inserted, the cooking tray 10 sticks out over the front edge of the cooking rack 150. The cooking tray 10 slides over the wire 151 using the long arm 21 of the downward extending member 20 to facilitate insertion. In this embodiment, the cooking tray 10 rests upon a series of horizontal support bars 157. When the cooking tray 10 slides completely over the wire 151, the cooking tray 10 falls down into place, causing the cooking tray 10 to sit directly on the wire 151, and securing the cooking tray 10 by deterring it from sliding out of the cooking rack 150. The downward extending member 20 nearest the rear of the cooking rack 150 sits abutted to the edge of the wire 151. For the cooking tray 10 to be removed from the cooking rack 150, the cooking tray 10 must be lifted at least 0.305 inches, so as to remove the downward extending member 20 from being obstructed by the wire 151. The downward extending member 20 deters the cooking tray 10 from falling out of the cooking rack 150 when being inserted and removed from the cooker.

Figure 13:
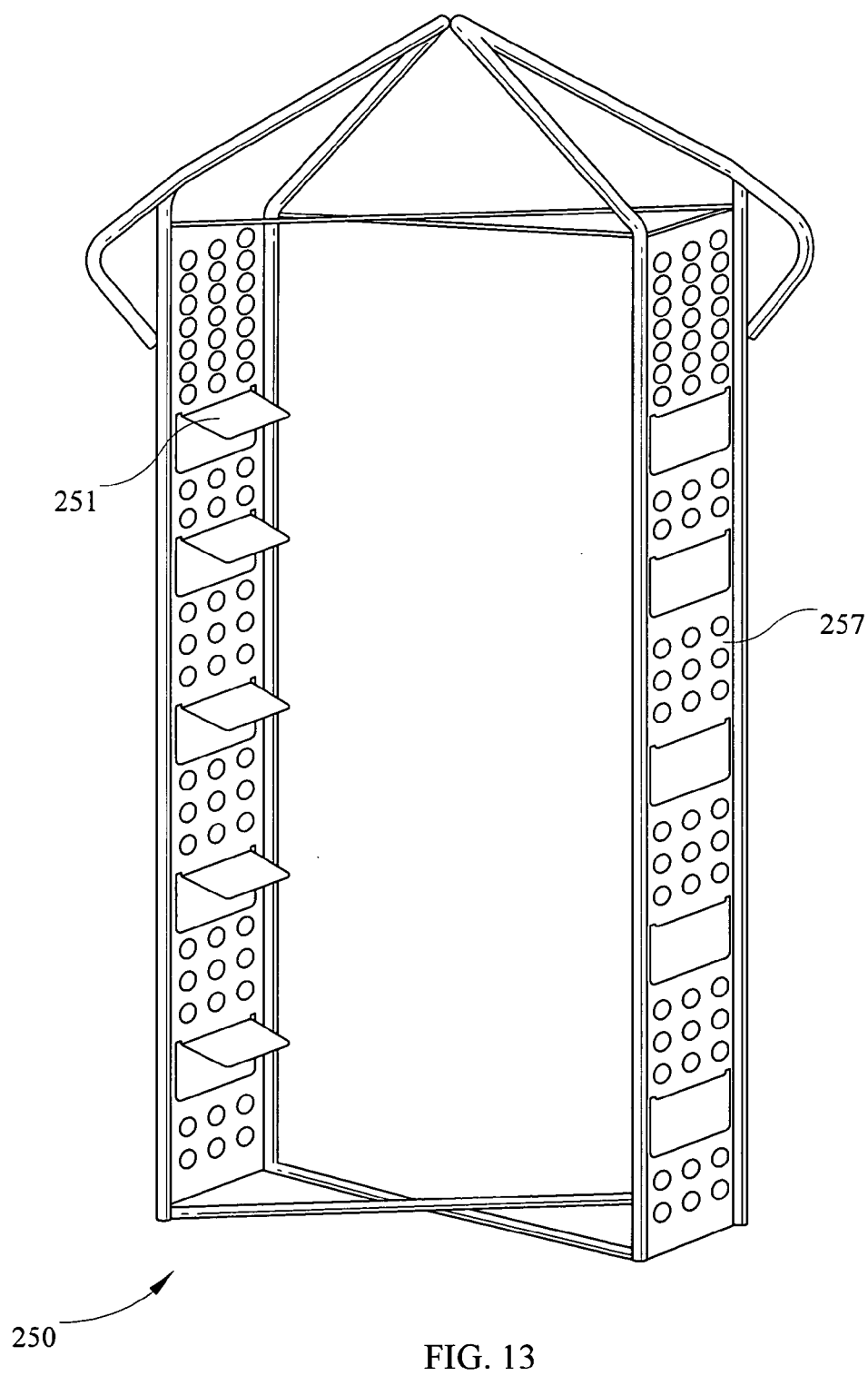
FIG. 13 shows an alternative cooking rack.
Figure 14:
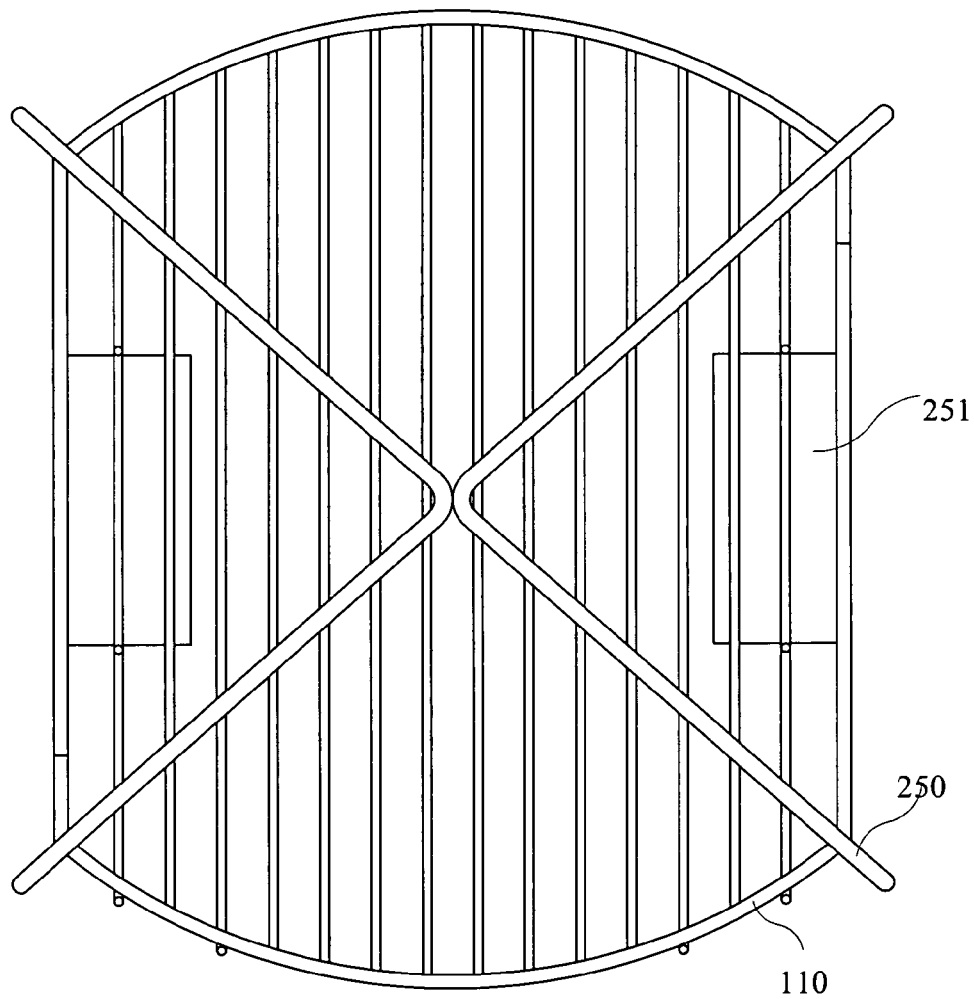
FIG. 14 shows a top view of the cooking rack of FIG. 13 with a cooking tray inserted.
Figure 15:
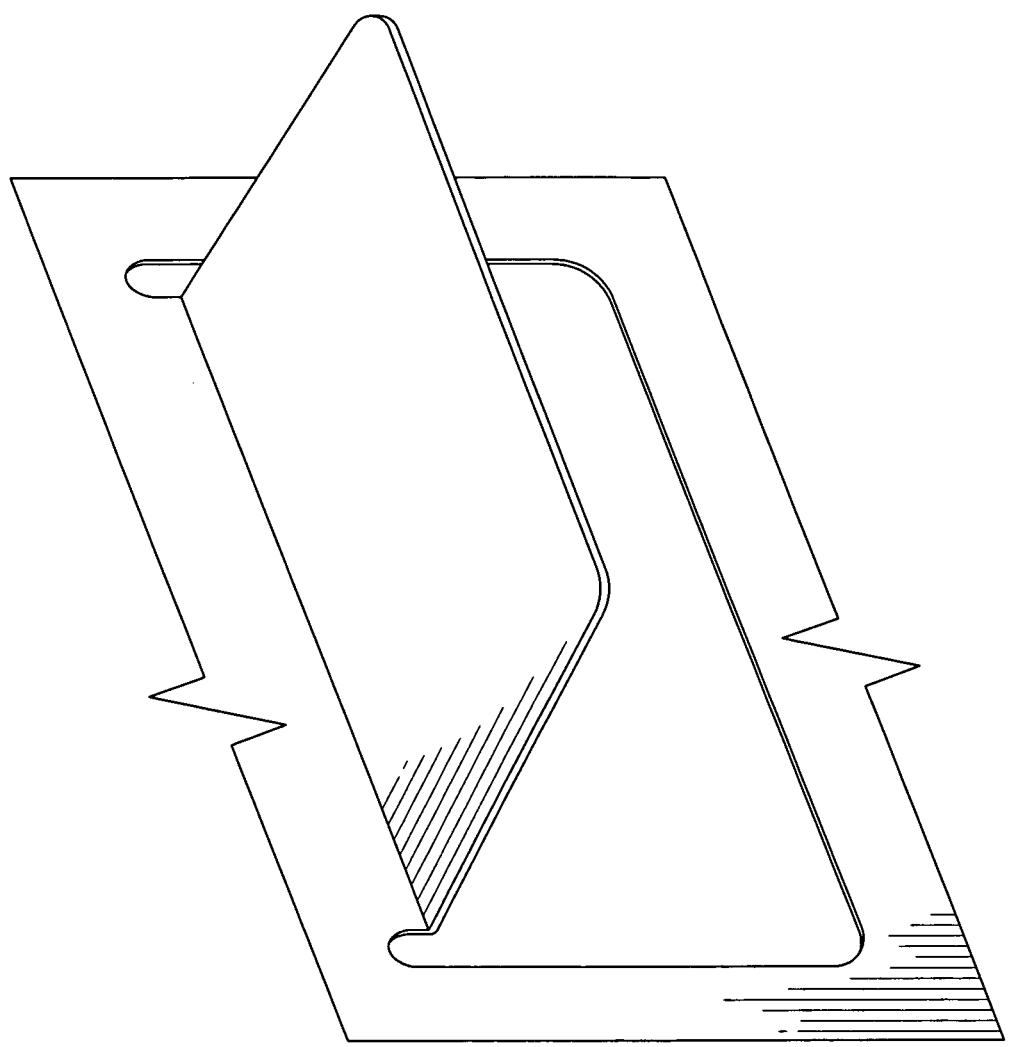
FIG. 15 shows the platform of the cooking rack of FIG. 13.

In a third embodiment, FIG. 13-15 show the cooking rack 250 having a platform 251 approximately 3.2 inches in length 252 and 1.5 inches in width 253. The thickness 256 of platform 251 is determined by the thickness of the material used to construct the walls 258 of the cooking rack 250. The cooking tray 10 is inserted into the cooking rack 250 by sliding along the platform 251. When inserted, the cooking tray 10 sticks out over the front and rear edges of the cooking rack 250 about 2.5 inches. The cooking tray 10 slides onto the platform 251 using the long arm 21 of the downward extending member 20 to facilitate insertion. When the cooking tray 10 reaches the end of the platform 251, the cooking tray 10 falls down into place, causing the cooking tray 10 is able to sit directly on the platform 251, being supported along the straight edges 35. The downward extending member 20 nearest the rear of the cooking rack 10 sits abutted to the edge of the platform 251. In a preferred embodiment of the cooking tray 10, the two downward extending members 20 on the same side of central axis 40 are opposed and cooperative, whereby contact between the downward extending members 20 and the platform 251 restricts forward and backward motion of the cooking tray 10. For the cooking tray 10 to be removed from the cooking rack 250, the cooking tray 10 must be lifted at least about 0.305 inches, so as to remove the downward extending member 20 from being obstructed by the edge of the platform 251. The downward extending member 20 deters the cooking tray 10 from falling out of the cooking rack 250 when being inserted and removed from the cooker. The cooking rack 250 of this embodiment 250 contains walls 257 along the sides having the platforms 251. In this embodiment, the walls 257 are to be produced from a punched aluminum or similar composition to generate circulation of the cooking ingredients, including shortening and any other cooking ingredients, such that the flow of cooking ingredients may evenly cook the products at an even temperature. The walls 257 of this embodiment should be punched to provide the maximum circulation of cooking ingredients while maintaining the structural integrity of the cooking rack 250.

In a preferred embodiment of cooking tray 10 of FIG. 1-4, the planar surface 30 is comprised of an aluminum surface. The aluminum will be punched to create circulation vents 33. The circulation vents 33 allows the shortening and other ingredients to reach the products being cooked from below to ensure an even cooking. The aluminum should be punched so that the maximum number of holes may be obtained, but still maintaining the structural integrity to support the products to be cooked in the cooker, accounting for the heat in the cooker.

Figure 5:
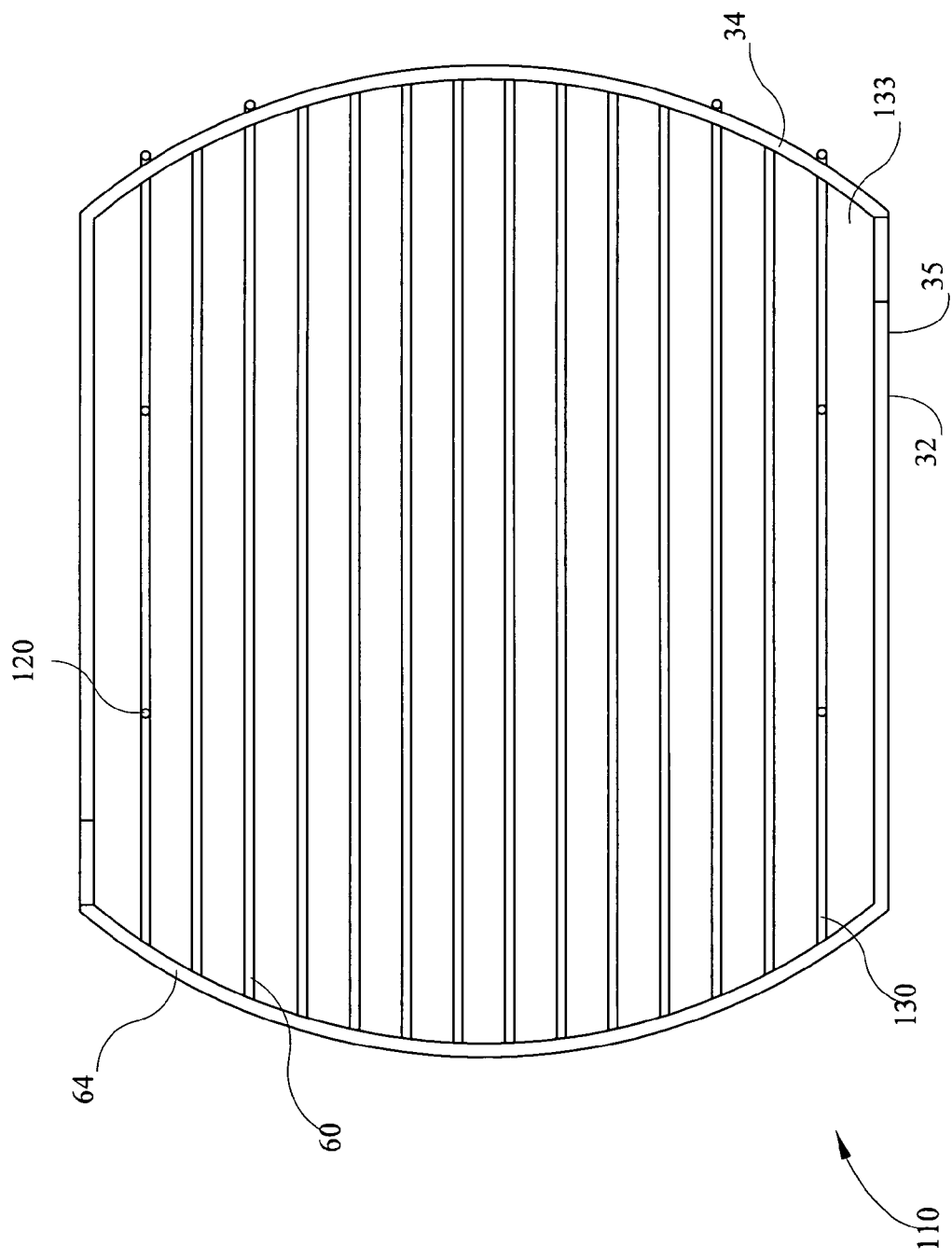
FIG. 5 shows a top view of an alternative cooking tray.
Figure 6:
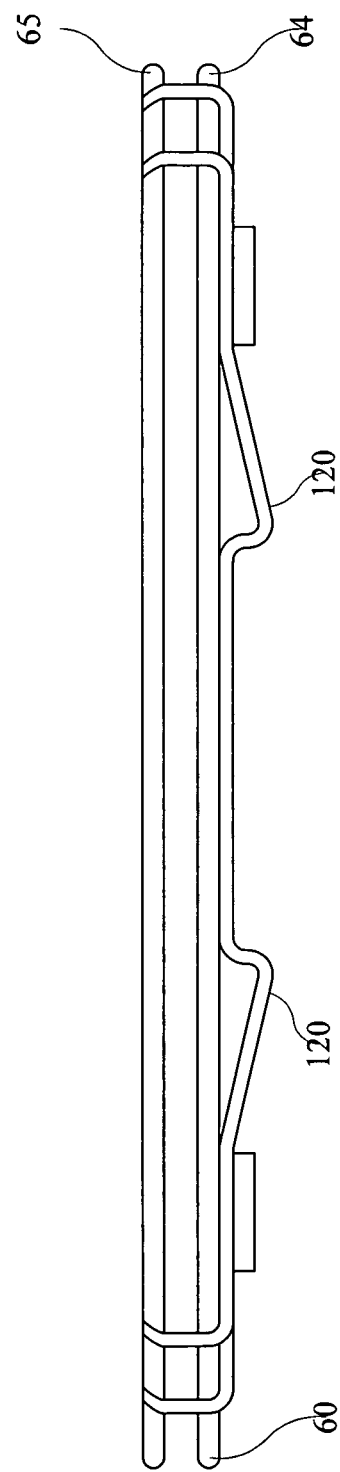
FIG. 6 shows a side view of the cooking tray of FIG. 5.
Figure 7:
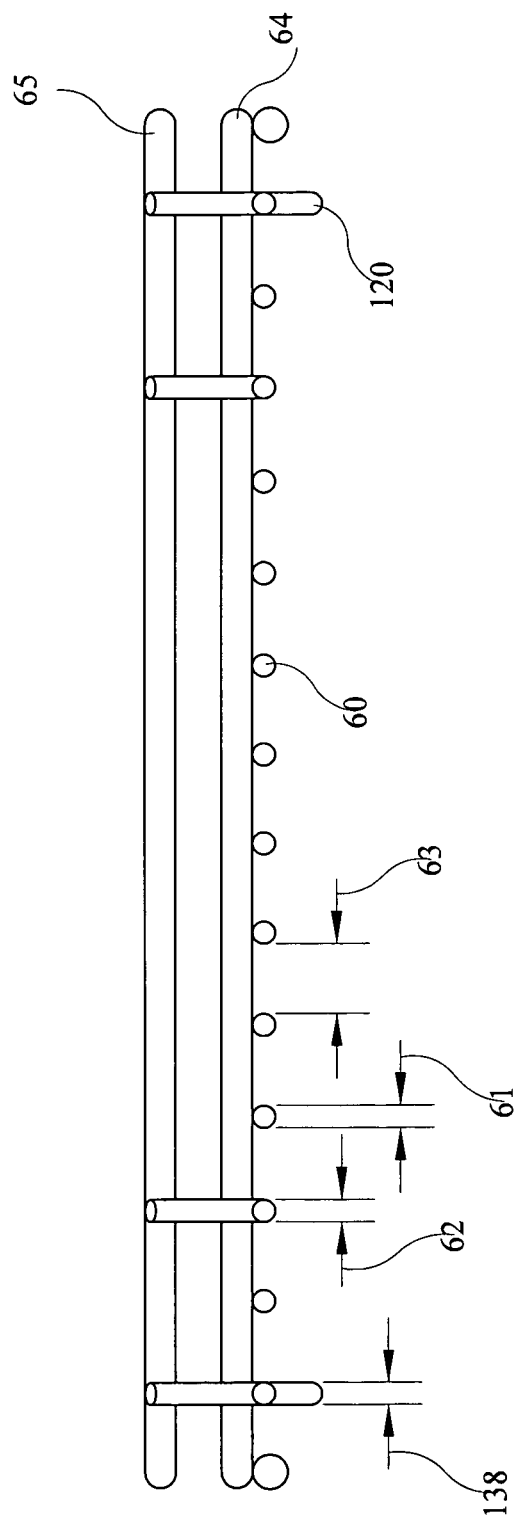
FIG. 7 shows a front view of the cooking tray of FIG. 5.

In an alternative embodiment showing cooking tray 110 in FIG. 5-7, the planar surface 130 is comprised of a series of 14 wires 60 in parallel having a thickness 61 of about 0.125 inches. The wires are separated by a distance 63 of about 0.425 inches. The circulation vents 133 in this embodiment are created by the open spaces between the wires. The wires 60 of this embodiment are held together using a first wire 64 in the shape of the planar surface 30 of the first embodiment. The first wire 64 defines the convex rounded edges and the lateral straight edges of this embodiment. The wires 60 of the planar surface 130 are preferably soldered or otherwise attached to the bottom of the first wire 64. A second wire 65 having the same shape as both the first wire 64 and the planar surface 30 of the first embodiment is positioned above the first wire 64, and is used as the container portion of this embodiment. The second wire 65 and first wire 64 define convex upward extending surfaces and lateral upward extending surfaces. The second wire 65 is supported by vertical support wires 62 that result from the bending the ends of the two outermost of the series of wires 60 transverse to the planar surface 130 until they reach the second wire 65 where they are soldered together. The downward extending member 120 of this embodiment is created by bending the outermost of the series of wires 60 into a J-shape similar to that of the first embodiment. In this embodiment, the width 138 of the downward extending member 120 is about 0.125 inch.

Each of the embodiments above are functional equivalents of every other embodiment and each combination of each embodiment works equally well, namely cooking tray 10 and 110 work equally well when used in connection with cooking rack 50, 150 and 250. The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A cooking apparatus, comprising:
    at least one cooking tray, said at least one cooking tray having a first wire defining convex rounded edges and lateral straight edges, a planar surface formed by a plurality of wires attached to said first wire, a plurality of downward extending members, a second wire having the same shape as the first wire, and at least one vertical support wire supporting the second wire above the first wire, whereby the first wire and the second wire define convex upward extending surfaces and lateral upward extending surfaces; and
    a cooking rack for removably securing said at least one cooking tray, said cooking rack having at least one support mechanism;
    whereby said at least one cooking tray is supported by said at least one support mechanism such that at least one of said plurality of downward extending member is obstructed by said at least one support mechanism; and
    wherein each of said plurality of downward extending members includes a long arm joined to a short arm.

2. The cooking apparatus of claim 1, wherein said cooking rack further comprises at least one wall and said at least one support is attached to said at least one wall.

3. The cooking apparatus of claim 2, wherein said at least one cooking tray is positioned in said cooking rack such that one of said lateral straight edges is adjacent and parallel to said at least one wall.

4. The cooking apparatus of claim 2, wherein said at least one wall includes circulation vents.

5. The cooking apparatus of claim 2, wherein said cooking rack comprises two parallel walls and a plurality of support mechanisms attached to said walls form one or more levels, whereby each of said one or more levels may receive and support one of said at least one cooking tray.

6. The cooking apparatus of claim 1, wherein said plurality of downward extending members comprises two opposed and cooperative downward extending members and wherein said at least one support mechanism is sized to fit between said two opposed and cooperative downward extending members.

7. The cooking apparatus of claim 1, wherein said at least one support mechanism is a platform.

8. The cooking apparatus of claim 1, said cooking tray having four downward extending members attached to the underside of said cooking tray, wherein one downward extending member is located in each quadrant of said cooking tray.

9. The cooking apparatus of claim 3, wherein said lateral upward extending surfaces are perpendicular to said planar surface.

10. The cooking apparatus of claim 1, wherein said long arm of each of said plurality of downward extending members is oriented toward the convex rounded edge nearest to said long arm.

\* \* \* \* \*